(12) United States Patent
Lee et al.

(10) Patent No.: US 7,991,946 B2
(45) Date of Patent: Aug. 2, 2011

(54) APPARATUS USING FLASH MEMORY AS STORAGE AND METHOD OF OPERATING THE SAME

(75) Inventors: Ki-Yong Lee, Yongin-si (KR); Hyo-Jun Kim, Yongin-si (KR); Hee-Seon Park, Seoul (KR); Kyoung-Gu Woo, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 526 days.

(21) Appl. No.: 12/195,588

(22) Filed: Aug. 21, 2008

(65) Prior Publication Data
US 2009/0055578 A1    Feb. 26, 2009

Related U.S. Application Data

(60) Provisional application No. 60/957,785, filed on Aug. 24, 2007.

(30) Foreign Application Priority Data

Jan. 18, 2008    (KR) .................. 10-2008-0005829

(51) Int. Cl.
    *G06F 12/10*    (2006.01)
(52) U.S. Cl. ......... 711/103; 711/154; 711/203; 711/206
(58) Field of Classification Search .................. 711/103, 711/203
    See application file for complete search history.

(56) References Cited

U.S. PATENT DOCUMENTS

| | | | |
|---|---|---|---|
| 6,275,436 B1 * | 8/2001 | Tobita et al. | 365/221 |
| 6,732,222 B1 | 5/2004 | Garritsen et al. | |
| 7,386,700 B2 * | 6/2008 | Lasser | 711/202 |
| 7,765,426 B2 * | 7/2010 | Li | 714/6.13 |
| 7,844,772 B2 * | 11/2010 | Moon et al. | 711/103 |
| 7,904,669 B2 * | 3/2011 | Mae | 711/154 |
| 2004/0186946 A1 | 9/2004 | Lee | |
| 2006/0112215 A1 | 5/2006 | Kim et al. | |
| 2006/0200500 A1 | 9/2006 | Baek et al. | |
| 2007/0136509 A1 | 6/2007 | Agami | |
| 2008/0082729 A1 * | 4/2008 | Moon et al. | 711/103 |
| 2008/0098195 A1 * | 4/2008 | Cheon et al. | 711/202 |
| 2008/0162792 A1 * | 7/2008 | Wu et al. | 711/103 |
| 2009/0132755 A1 * | 5/2009 | Radke | 711/103 |

(Continued)

FOREIGN PATENT DOCUMENTS

KR    20040082921    9/2004

OTHER PUBLICATIONS

International Search Report issued Mar. 2, 2009 in International Application No. PCT/KR2008/004852.

*Primary Examiner* — Jack A Lane
(74) *Attorney, Agent, or Firm* — Stanzione & Kim, LLP

(57) ABSTRACT

An apparatus usable with a flash memory as storage and a method of operating the same are provided, which can provide an optimized architecture to a flash memory through combination of a flash transition layer (FTL) with a database. The apparatus includes a flash memory, a device driver to manage a mapping table between logical addresses and physical addresses in accordance with a data operation in the flash memory, and a control unit to perform data recovery of the flash memory by requesting the mapping table through an interface provided by the device driver.

17 Claims, 4 Drawing Sheets

U.S. PATENT DOCUMENTS

| | | | |
|---|---|---|---|
| 2009/0172253 A1* | 7/2009 | Rothman et al. | 711/103 |
| 2009/0172269 A1* | 7/2009 | Song et al. | 711/103 |
| 2009/0172276 A1* | 7/2009 | Nochimowski et al. | 711/114 |
| 2010/0217927 A1* | 8/2010 | Song et al. | 711/103 |
| 2010/0254173 A1* | 10/2010 | Zhou et al. | 365/63 |
| 2010/0287410 A1* | 11/2010 | Li | 714/16 |
| 2011/0022779 A1* | 1/2011 | Lund et al. | 711/103 |
| 2011/0055455 A1* | 3/2011 | Post et al. | 711/103 |

* cited by examiner

| | | | | | | |
|---|---|---|---|---|---|---|
| 211 — LOGICAL PAGE NUMBER | 0 | 1 | 2 | 3 | ... |
| 212 — PHYSICAL PAGE NUMBER | 4 | 2 | 0 | 1 | ... |
| 213 — TRANSACTION PAGE NUMBER | – | 68 | 69 | – | ... |
| 214 — TRANSACTION ID | – | 1 | 1 | – | ... |

| | | | | | |
|---|---|---|---|---|---|
| 221 — LOGICAL PAGE NUMBER | 0 | 1 | 2 | 3 | ... |
| 222 — PHYSICAL PAGE NUMBER | 4 | 68 | 69 | 1 | ... |

APPARATUS USING FLASH MEMORY AS STORAGE AND METHOD OF OPERATING THE SAME

CROSS-REFERENCE TO RELATED APPLICATIONS

This application is based on and claims priority from U.S. Provisional Patent Application No. 60/957,785 filed on Aug. 24, 2007 in the USPTO and claims priority under 35 U.S.C. §119(a) from Korean Patent Application No. 10-2008-0005829 filed on Jan. 18, 2008 in the Korean Intellectual Property Office, the disclosures of which are incorporated herein in their entirety by reference.

BACKGROUND OF THE INVENTION

1. Field of the Invention

The present general inventive concept relates to an apparatus using a flash memory as storage and a method of operating the same, and more particularly, to an apparatus using a flash memory as storage and a method of operating the same, which can provide an optimized architecture to a flash memory through combination of an FTL (Flash Translation Layer) with a database.

2. Description of the Related Art

Generally, in an embedded system, such as a home appliance, a communication appliance, a set top box, and the like, a nonvolatile memory has been widely used as a storage medium for storing and processing data.

A flash memory, which is a type of nonvolatile memory, is a nonvolatile storage device that can electrically delete or rewrite data. Since the flash memory has a low power consumption in comparison to a storage medium based on a magnetic disk memory, a rapid access time in comparison to a hard disk, and a small size, the flash memory is suitable to be used in a portable device.

Such a flash memory has a different characteristic from a magnetic storage medium, such as a hard disk. Specifically, in the flash memory, data read/write operation can be performed in a unit of a page, but data update work cannot be performed in the unit of the page. In order to perform the data update work in the flash memory, a delete operation in the unit of a block that is composed of a plurality of pages is required, and generally, the delete unit is larger than the write unit. This feature of the flash memory is difficult using a file system designed based on a hard disk.

Accordingly, in order to complement the characteristic that the delete unit is larger than the write unit in the flash memory and the characteristic that the number of deletions is limited in the flash memory, and to use a file system designed based on a hard disk, a flash translation layer (FTL) has been developed. The FTL is a type of software layer allowing flash memory to be used in the same manner as a hard disk.

Recently, with an increase of the capacity of a flash memory, a large amount of data can be stored in flash memory. Accordingly, the use of a database is essential in an apparatus using the flash memory as storage. For example, in an apparatus using the flash memory as storage, log-based recovery and shadow paging techniques have been used as mechanisms for data recovery.

The log-based recovery technique generates log records for changes in the database, stores the log records in the disk, and uses the log records for the database recovery. The log records for the changes include previous data and new data for the changed data, and are written in the disk via log buffers as needed. According to this log-based recovery technique, the log records, which usually are very small, are frequently written in the disk whenever the changes are generated. Accordingly, pages are frequently used due to the frequent writing of the log records, and thus a deletion operation, which is relatively slow in comparison to the read/write operation, is frequently performed in order to withdraw the pages that have become ineffective.

If a specified page is updated, the shadow paging technique updates data of the corresponding page by making a copy of the page in another page, without using the log records. If a transaction is terminated, the technique reflects the transaction in a new disk, while if the transaction is aborted, the technique discards the copy. According to the shadow paging technique, the frequent writing of the log records as in the log-based recovery technique is not performed, but is required to separately manage a page table for managing pages in which copies of the updated pages are written. That is, the database manages the mapping operation between logical addresses and physical addresses. However, since the physical addresses managed in the database are once again translated into physical addresses through the mapping table managed by the FTL and the mapping information is managed by the database and the FTL, unnecessary duplication work is performed.

Accordingly, there is a need for a database architecture that considers the characteristic of a flash memory in an apparatus using the flash memory as storage.

Korean Patent Unexamined Publication No. 2004-0082921 relates to a flash file system which has an FTL (Flash Translation Layer) and performs mapping of logical addresses received from a host system on physical addresses of a flash memory. This flash file system, however, still fails to propose a database architecture that considers the characteristic of a flash memory in an apparatus using the flash memory as storage.

SUMMARY OF THE INVENTION

The present general inventive concept provides an apparatus using a flash memory as storage and a method of operating the same, in which in consideration of a relation between an FTL (Flash Translation Layer) and a database, the FTL uses a data recovery technique suitable to a flash memory and the database processes transactions accordingly, so that management of log records and a page table can be omitted.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an apparatus which includes a flash memory to store data, a device driver to manage a mapping table between logical addresses and physical addresses in accordance with a data operation in the flash memory, and a control unit to perform data recovery of the flash memory by requesting the mapping table through an interface provided by the device driver.

The foregoing and/or other aspects and utilities of the general inventive concept may also be achieved by providing a method of operating an apparatus usable with a flash memory as storage, the method including managing a mapping table between logical addresses and physical addresses by a flash translation layer in accordance with a data operation in the flash memory, and performing data recovery of the flash memory by a database requesting the mapping table through an interface provided by the flash translation layer.

The foregoing and/or other aspects and utilities of the general inventive concept may also be achieved by providing an apparatus usable with a flash memory, the apparatus including a device driver to manage a mapping table between logical addresses and physical addresses in accordance with a data operation in the flash memory, and a control unit to perform data recovery of the flash memory by requesting the mapping table through an interface provided by the device driver.

The foregoing and/or other aspects and utilities of the general inventive concept may also be achieved by providing a storage system including a flash memory to store a mapping table, and an apparatus including a flash transition layer to manage the mapping table, and a database to perform data recovery to the flash memory, wherein the managing of the mapping table and the performing of data recovery is performed without a page table and generation of log records by the database.

The mapping table may correspond to a mapping relationship between logical addresses and physical addresses.

The foregoing and/or other aspects and utilities of the general inventive concept may also be achieved by providing a data recovery method including requesting a mapping table from a flash memory by a control unit, receiving the requested mapping table by the control unit, and recovering data based on the received mapping table.

The foregoing and/or other aspects and utilities of the general inventive concept may also be achieved by providing a computer-readable recording medium having embodied thereon a computer program to execute a method, wherein the method includes requesting a mapping table from a flash memory by a control unit, receiving the requested mapping table by the control unit, and recovering data based on the received mapping table.

BRIEF DESCRIPTION OF THE DRAWINGS

The above and other objects, features and utilities of the present general inventive concept will be more apparent from the following detailed description taken in conjunction with the accompanying drawings, in which:

FIG. 2 is a schematic view illustrating a mapping table when a transaction is executed according to an embodiment of the present general inventive concept;

FIG. 3 is a schematic view illustrating a mapping table during transaction commit according to an embodiment of the present general inventive concept;

DETAILED DESCRIPTION OF THE PREFERRED EMBODIMENTS

Figure 1:
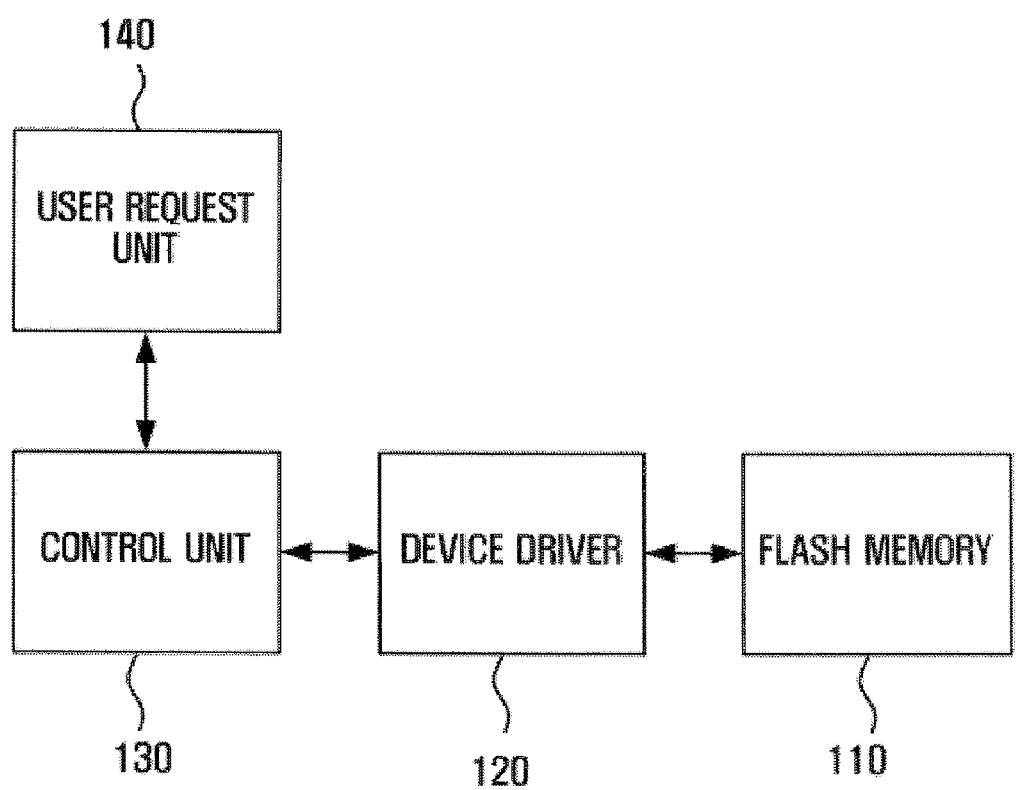
FIG. 1 is a block diagram illustrating an apparatus using a flash memory as storage according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

The present invention will be described herein with reference to the accompanying drawings illustrating block diagrams and flowcharts to explain an apparatus using a flash memory as storage and a method of operating the same according to embodiments of the present general inventive concept. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create implementations of the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction implementations to implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations to implement the functions specified in the flowchart block or blocks.

Also, each block of the flowchart illustrations may represent a module, segment, or portion of code, which includes one or more executable instructions to implement the specified logical function(s). It should also be noted that in some alternative implementations, the functions noted in the blocks may occur out of the order. For example, two blocks illustrated in succession may in fact be executed substantially concurrently or the blocks may sometimes be executed in the reverse order, depending upon the functionality involved.

FIG. 1 is a block diagram illustrating an apparatus using a flash memory as storage according to an embodiment of the present general inventive concept.

As illustrated in FIG. 1, the apparatus 100 using a flash memory as a storage according to an embodiment of the present general inventive concept includes a flash memory 110, a device driver 120, a control unit 130, and a user request unit 140.

The flash memory 110 includes a plurality of blocks constituting at least one page. In the present embodiment, the page is a read/write unit in the flash memory 110, and the block is a delete unit in the flash memory 110. In the present embodiment, although the terms "page" and "block" are used to designate the read/write unit and the delete unit of the flash memory 110, respectively, this is merely exemplary to understand the present general inventive concept, and thus may be changed.

The device driver 120 performs a function corresponding to the above-described FTL (Flash Translation Layer). The device driver 120 may be the FTL, or may include the FTL and hardware to drive the FTL.

In the present embodiment, the device driver 120 provides a plurality of APIs (Application Programming Interfaces) to perform various types of data operations such as read, write, and the like, in the flash memory 110.

The API provided by the device driver 120 according to the present embodiment includes "FTL_Init( )" to initialize the flash memory 110, "FTL_Format( )" to format the flash memory 110, "FTL_Read( )" to read data from the flash memory 110, "FTL_Write( )" to write data in the flash memory 110, "FTL_BeginTxn( )" to start transactions on the flash memory 110, "FTL_CommitTxn( )" to commit transactions on the flash memory 110, and "FTL_Abort( )" to abort transactions on the flash memory 110.

In addition, the device driver 120 generates and manages a mapping table indicating a mapping relation between logical address and physical addresses for various types of data operation performed in the flash memory 110. In this case, the mapping table generated by the device driver 120 according to the present embodiment is based on a shadow paging technique of a database as described above.

Hereinafter, in an embodiment of the present general inventive concept, a logical page number is used as the logical address and a physical page number is used as the physical address.

FIG. 2 is a schematic view illustrating a mapping table according to an embodiment of the present general inventive concept.

As illustrated in FIG. 2, the mapping table 210 according to an embodiment of the present general inventive concept includes a logical page number field 211, a physical page number field 212, a transaction page number field 213, and a transaction identification (ID) field 214.

The logical page number field 211 indicates a logical page number referred to when a user requests data operation through the user request unit 140, and the physical page number field 212 indicates a physical page number in which data according to the data operation requested by the user in the flash memory 110 is actually written. The transaction page number field 213 indicates a physical page number newly allocated to the corresponding logical page number when a data update of the physical page number in which specified data has already been written is requested, and the transaction ID field 214 indicates a transaction ID allocated to each data operation requested by a user. For example, with respect to the data operation, of which the transaction ID is "1" as illustrated in FIG. 2, the physical page number mapping on the logical page number "2" becomes "0". At this time, if a data update of the logical page number 2 is requested, the updated data is written in physical page number "69". Also, in FIG. 2, a sign "–" refers to a new physical page number not allocated because no data update is requested in the transaction page number field 213, and thus the transaction ID is not generated. In this case, in the present embodiment, the user request unit 140 is an application program by which the user can request the data operation and confirm a result of the data operation.

The device driver 120, during the transaction commit, updates the physical page number of the physical page number field 212 to the physical page number of the transaction page number field 213, and deletes the transaction ID field 214, so as to generate a mapping table 220 composed of a logical page number field 221 and a physical page number field 222 as illustrated in FIG. 3. Referring to FIGS. 1 and 3, the device driver 120, during the transaction commit, writes a respective mapping table 220 of FIG. 3 in the flash memory 110, so as to use the mapping table 220 for data recovery when an unexpected situation such as a power supply interception occurs. As described above, since the device driver 120 writes the mapping table 220 for data recovery in the flash memory 110 during the transaction commit, the data can be recovered with reference to the mapping table 220 written in the flash memory 110, without using separate information.

The control unit 130 may be the database, or may include the database and hardware for the database. As described above, the control unit 130 requests the data operation in the flash memory 110 by calling APIs, such as "FTL_Read( )", "FTL_Write( )", "FTL_BeginTxn( )", "FTL_Commit Txn( )", "FTL_Abort( )", and the like, provided by the device driver 120, and receives a result of the data operation having been requested.

For example, the control unit 130 may be allocated with a new transaction ID from the device driver 120 by calling "FTL_BeginYnx( )", and may write data in the flash memory 110 by calling "FTL_Write( )". Also, the control unit 130 may complete the transaction by calling "FTL_CommitTxn( )". At this time, if the control unit 130 calls "FTL_CommitTxn( )", the device driver 120 may update the mapping table 210 of FIG. 2 to the respective mapping table 220 of FIG. 3, and may write the updated mapping table 220 in the flash memory 110.

Alternatively, when the control unit 130 calls "FTL_Read( )", the device driver 120 returns the transaction page number if the transaction page number is allocated to the corresponding logical page number, while the device driver 120 returns the existing physical page number otherwise. When the control unit 130 calls "FTL_Abort( )", the device driver 120 searches for the logical page number allocated with the transaction ID, and removes the corresponding transaction page number and transaction ID.

As described above, according to the present embodiment, the device driver 120 provides APIs, such as "FTL_Read ( )", "FTL_Write( )", "FTL_BeginTxn( )", "FTL_Commit Txn( )", "FTL_Abort( )", and the like, the control unit 130 calls and uses the provided APIs, and the device driver 120 manages a mapping relation between the logical addresses and the physical addresses through the respective mapping table. Accordingly, the database and the FTL, which are optimized independently, are prevented from performing duplicate work.

Figure 4:
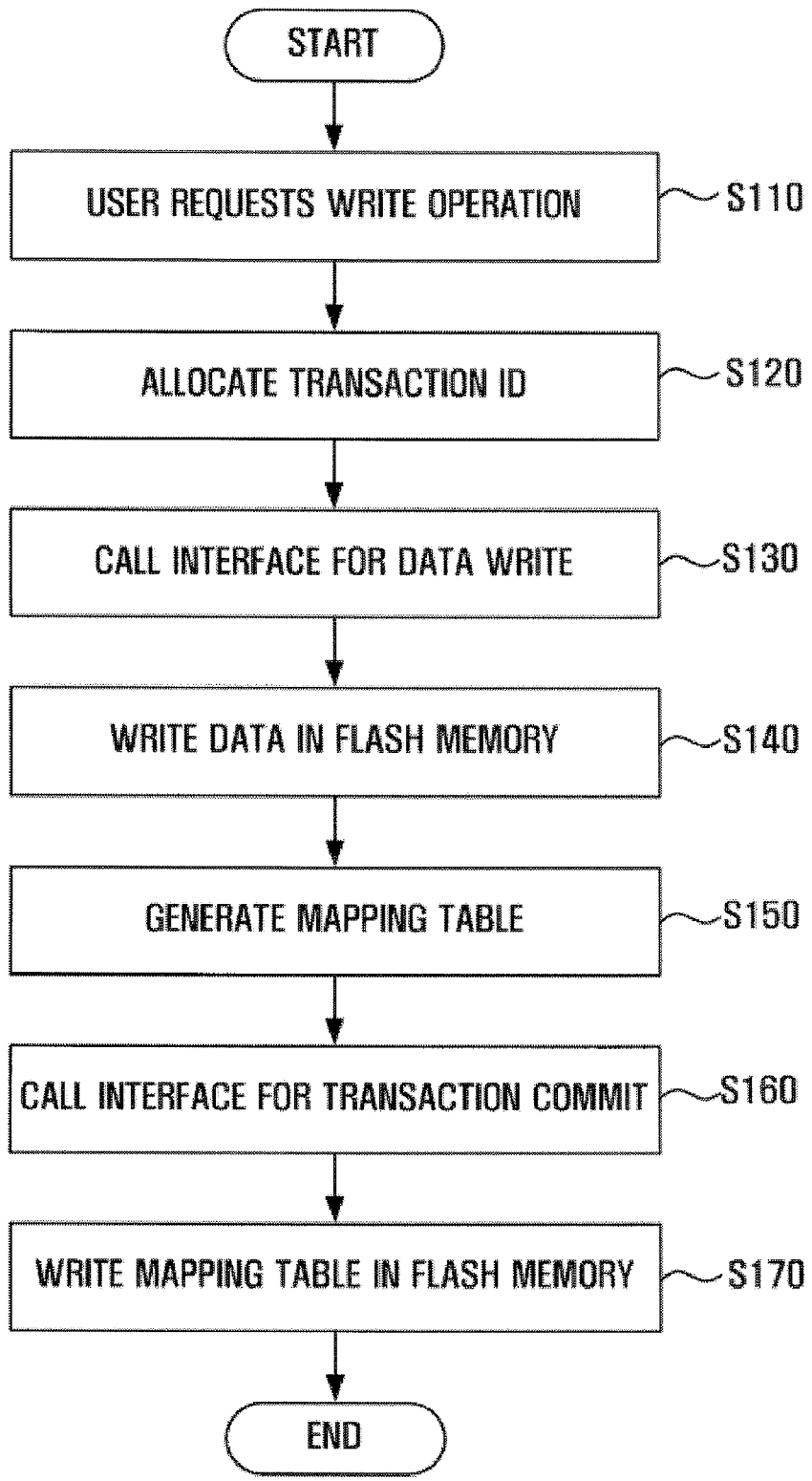
FIG. 4 is a flowchart illustrating a method of writing a mapping table according to an embodiment of the present general inventive concept.

FIG. 4 is a flowchart illustrating a method of writing a mapping table according to an embodiment of the present general inventive concept.

The method as illustrated in FIG. 4 is a method of writing a mapping table for data recovery in the flash memory 110.

As illustrated in FIG. 4, according to the method of operating an apparatus using a flash memory as a storage according to an embodiment of the present general inventive concept, a user first requests a specified data operation through a user request unit 140 (operation S110). In the present embodiment, the user requests a write operation in the flash memory 110.

In accordance with the user's request for the data operation, the control unit 130 calls "FTL_BeginTxn( )" provided by the device driver 120, and is allocated with a transaction ID generated by the device driver 120 (operation S120). In the present embodiment, the device driver 120 is allocated with the transaction ID of "1" from the control unit 130.

The control unit 130 requests a data write to the device driver 120 by calling "FTL_Write( )" with reference to the allocated transaction ID (operation S130), and the device driver 120 writes the data requested by the control unit 130 in the flash memory 110 (operation S140). For example, if the control unit 130 requests the data write in the logical page numbers 1 and 2, and the data has already been written in the physical page numbers corresponding to the logical page numbers 1 and 2, the device driver 120, as illustrated in FIG. 2, writes the data requested by the control unit 130 and the transaction ID in new physical page numbers 68 and 69.

The device driver 120 writes the data requested by the control unit 130, and simultaneously generates the mapping table 210 as illustrated in FIG. 2 (operation S150). At this time, since the mapping table is updated, the transaction page number and the transaction ID may be indicated.

If the data write in accordance with the user's request for the data operation is completed, the control unit 130 completes the data operation by calling "FTL_CommitTxn( )" provided by the device driver 120 (operation S160).

When the control unit 130 calls "FTL_CommitTxn( )", the device driver 120 changes the mapping table 210 as illustrated in FIG. 2 to the mapping table 220 as illustrated in FIG. 3, and writes the changed mapping table 210 in the flash memory 110 (operation S170).

Figure 5:
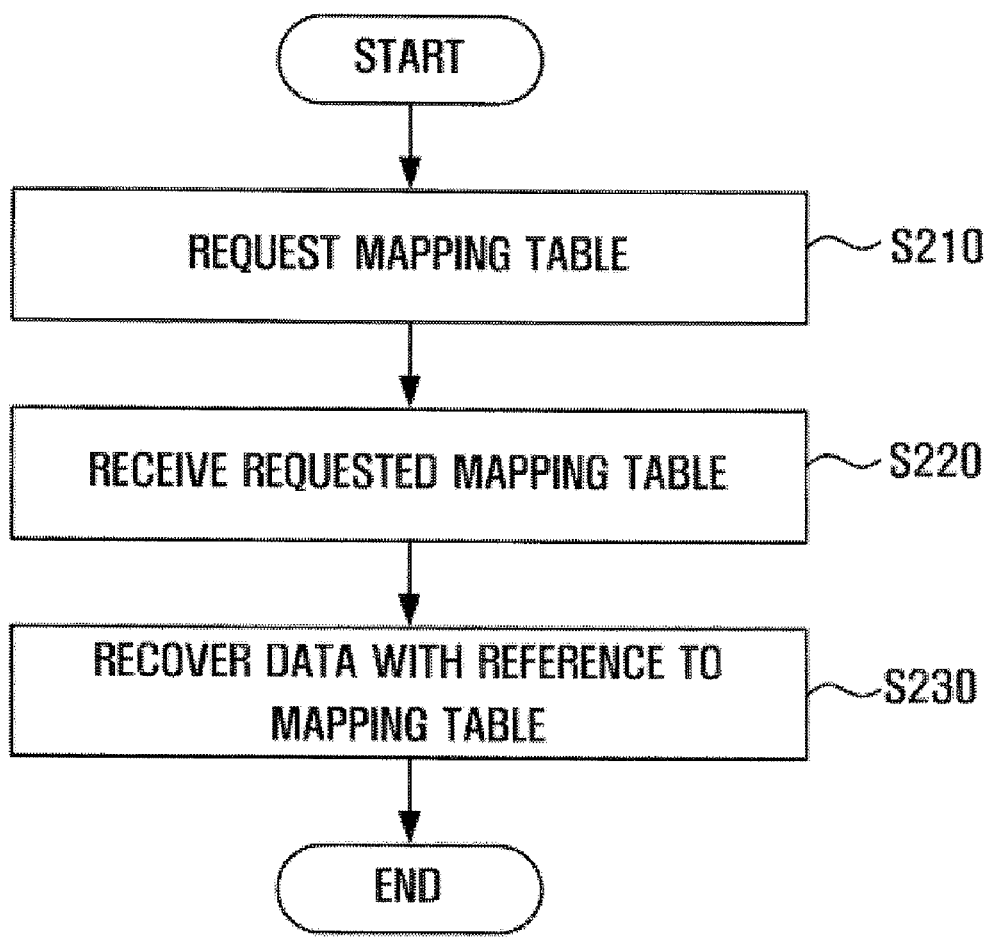
FIG. 5 is a flowchart illustrating a data recovery method according to an embodiment of the present general inventive concept.

FIG. 5 is a flowchart illustrating a data recovery method according to an embodiment of the present general inventive concept.

As illustrated in FIG. 5, according to the data recovery method according to an embodiment of the present general inventive concept, if an unexpected situation such as a power supply interception occurs, the control unit 130 requests a mapping table to the device driver 120 (operation S210). At this time, the requested mapping table may be understood as the mapping table written in the flash memory 110 by the device driver 120 when the control unit calls "FTL_Commit-Txn( )".

The control unit 130 receives the requested mapping table from the device driver 120 (operation S220), and recovers the data with reference to the received mapping table (operation S230).

According to the data recovery method of FIG. 5 as described above, since the database is provided based on a hard disk rather than the flash memory 110 on an assumption that the device driver 120 is the FTL and the control unit 130 is the database, the log record generation by the control unit 120, frequent write operation, duplicate work of the device driver 120 and the control unit 130, and the like, can be prevented in advance, thus preventing shortening of a respective life span thereof and lowering of an operation speed due to the deletion work in the flash memory 110.

In the present embodiment, the term "unit", as used herein, refers to, but is not limited to, a software or hardware component, such as a Field Programmable Gate Array (FPGA) or Application Specific Integrated Circuit (ASIC), to perform certain tasks. A unit may be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and modules or further separated into additional components and modules.

As described above, the apparatus using a flash memory as a storage and the method of operating the same according to the embodiments of the present general inventive concept have one or more of the following effects.

In consideration of characteristics of the FTL and the database, the frequency of deleting work in the flash memory and duplicating work in the FTL and the database are prevented from occurring.

In addition, by preventing the deleting of work and the duplicating of work, the life span of the flash memory is increased, and the data operation speed can be improved.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An apparatus, comprising:
    a flash memory to store data;
    a device driver to manage a mapping table between logical addresses and physical addresses in accordance with a data operation in the flash memory; and
    a control unit to perform data recovery of the flash memory by requesting the mapping table through an interface provided by the device driver.

2. The apparatus of claim 1, wherein the interface provided by the device driver comprises:
    a write, a read, a transaction start, a transaction commit, and a transaction abort.

3. The apparatus of claim 2, wherein the device driver generates a new transaction identification (ID) and returns the generated transaction ID to the control unit when the control unit calls the transaction start.

4. The apparatus of claim 3, wherein the device driver generates a mapping table comprising:
    a logical page number field, a physical page number field, a transaction page number field, and a transaction ID field when the control unit calls the transaction start.

5. The apparatus of claim 4, wherein the device driver updates the physical page number field in the mapping table to the transaction page number, and deletes the transaction ID field, so as to generate and write the resultant mapping table in the flash memory, when the control unit calls the transaction commit.

6. The apparatus of claim 5, wherein the control unit performs data recovery in the flash memory by requesting the written mapping table.

7. The apparatus of claim 4, wherein the device driver returns a value of the transaction page number field between the physical page number field and the transaction page number field in the mapping table when the control unit calls the write.

8. A method of operating an apparatus having a flash memory as storage, the method comprising:
    managing a mapping table between logical addresses and physical addresses by a flash translation layer in accordance with a data operation in the flash memory; and
    performing data recovery of the flash memory by a database requesting the mapping table through an interface provided by the flash translation layer.

9. The method of claim 8, wherein the interface comprises:
    a write, a read, a transaction start, a transaction commit, and a transaction abort.

10. The method of claim 9, wherein the managing comprises:
    generating a new transaction identification (ID) and returning the generated transaction ID to the database when the database calls the transaction start.

11. The method of claim 10, wherein the managing comprises:
    generating a mapping table including a logical page number field, a physical page number field, a transaction page number field, and a transaction ID field when the database calls the transaction start.

12. The method of claim 11, wherein the managing comprises:
    updating the physical page number field in the mapping table to the transaction page number, and deleting the transaction ID field, so as to generate and write the resultant mapping table in the flash memory, when the database calls the transaction commit.

13. The method of claim 12, wherein the performing comprises:
performing data recovery in the flash memory by the database requesting the written mapping table.

14. The method of claim 11, wherein the managing comprises:
returning a value of the transaction page number field between the physical page number field and the transaction page number field in the mapping table when the database calls the write.

15. An apparatus usable with a flash memory, the apparatus comprising:
a device driver to manage a mapping table between logical addresses and physical addresses in accordance with a data operation in the flash memory; and
a control unit to perform data recovery of the flash memory by requesting the mapping table through an interface provided by the device driver.

16. A storage system, comprising:
a flash memory to store a mapping table; and
an apparatus comprising:
a flash transition layer to manage the mapping table; and
a database to perform data recovery to the flash memory,
wherein the managing of the mapping table and the performing of data recovery is performed without a page table and generation of log records by the database.

17. The storage system of claim 16, wherein the mapping table corresponds to a mapping relationship between logical addresses and physical addresses.

* * * * *